US009376006B2

(12) United States Patent
Terayama et al.

(10) Patent No.: US 9,376,006 B2
(45) Date of Patent: Jun. 28, 2016

(54) VEHICLE (71) Applicant: HONDA MOTOR CO., LTD., Tokyo (JP)

(72) Inventors: Yoshito Terayama, Utsunomiya (JP); Yoshinori Ando, Sakura (JP); Toshinori Tsukamoto, Utsunomiya (JP); Masaki Negoro, Utsunomiya (JP); Yoshikazu Fujimoto, Utsunomiya (JP); Masatoshi Noguchi, Utsunomiya (JP); Yusuke Sakaguchi, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/779,405

(22) PCT Filed: Dec. 16, 2014

(86) PCT No.: PCT/JP2014/083232
§ 371 (c)(1),
(2) Date: Sep. 23, 2015

(87) PCT Pub. No.: WO2015/093464
PCT Pub. Date: Jun. 25, 2015

(65) Prior Publication Data
US 2016/0039405 A1 Feb. 11, 2016

(30) Foreign Application Priority Data
Dec. 17, 2013 (JP) .................................. 2013-260105

(51) Int. Cl.
*B60L 9/00* (2006.01)
*B60K 6/442* (2007.10)
(Continued)

(52) U.S. Cl.
CPC . *B60K 6/442* (2013.01); *B60K 6/52* (2013.01); *B60K 6/547* (2013.01); *B60L 11/18* (2013.01);
(Continued)

(58) Field of Classification Search
USPC .......................................................... 701/22
See application file for complete search history.

(56) References Cited

U.S. PATENT DOCUMENTS

| 5,524,079 | A * | 6/1996 | Ishida ..................... B62D 7/159 |
| | | | 180/412 |
| 6,629,026 | B1 * | 9/2003 | Baraszu ................... B60K 6/48 |
| | | | 180/65.25 |

(Continued)

FOREIGN PATENT DOCUMENTS

| JP | 5-111111 A | 4/1993 |
| JP | 2000-238549 A | 9/2000 |

(Continued)

OTHER PUBLICATIONS

International Search Report dated Mar. 24, 2015, issued in counterpart International Application No. PCT/JP2014/083232 (1 page).

*Primary Examiner* — Hussein A. Elchanti
(74) *Attorney, Agent, or Firm* — Westerman, Hattori, Daniels & Adrian, LLP (57) ABSTRACT

Provided is a vehicle provided with left and right electric motors electrically connected to a battery and mechanically connected respectively to left and right vehicle wheels, a power generator mechanically connected to an internal combustion engine being electrically connected to the battery, wherein the battery is reliably protected during traction control and at other such times. Two electric motors, specifically first and second electric motors, are temporarily handled integrally to determine a torque down amount (TD), which is the total allowable power variation width ($\alpha$) of the two electric motors, on the basis of left and right total power (Y), and the respective motive powers of the first and second electric motors are controlled while being limited by values obtained by simply dividing the determined torque down amount (TD) equally, whereby the allowable input/output power (allowable input power (Z)) of the battery is reliably protected.

5 Claims, 8 Drawing Sheets

(51) Int. Cl.
 B60K 6/52 (2007.10)
 B60K 6/547 (2007.10)
 B60L 11/18 (2006.01)
 B60W 10/08 (2006.01)
 B60W 20/00 (2016.01)
 B60W 30/02 (2012.01)

(52) U.S. Cl.
 CPC ............... B60W 10/08 (2013.01); B60W 20/00 (2013.01); B60W 20/102 (2013.01); B60W 20/108 (2013.01); B60W 30/02 (2013.01); *Y02T 10/6234* (2013.01); *Y02T 10/6243* (2013.01); *Y02T 10/6265* (2013.01); *Y02T 10/648* (2013.01); *Y02T 10/7005* (2013.01); *Y02T 10/7022* (2013.01); *Y10S 903/906* (2013.01)

(56) References Cited

U.S. PATENT DOCUMENTS

| | | | |
|---|---|---|---|
| 2001/0038240 A1* | 11/2001 | Yoshida | B60T 7/042 303/28 |
| 2004/0207257 A1* | 10/2004 | Faye | B60T 7/12 303/125 |
| 2006/0004509 A1* | 1/2006 | Teslak | B60K 6/12 701/84 |
| 2008/0177434 A1* | 7/2008 | Moran | B60K 6/12 701/22 |
| 2008/0309264 A1* | 12/2008 | Izumi | B60L 11/1851 318/376 |
| 2012/0234133 A1 | 9/2012 | Ikegami et al. | |
| 2014/0191689 A1 | 7/2014 | Noguchi et al. | |
| 2014/0349811 A1* | 11/2014 | Ichikawa | B60W 10/02 477/5 |
| 2015/0088350 A1* | 3/2015 | Tamachi | B60K 6/445 701/22 |
| 2016/0046284 A1* | 2/2016 | Inoue | B60K 6/48 701/22 |

FOREIGN PATENT DOCUMENTS

| | | |
|---|---|---|
| JP | 2007-245896 A | 9/2007 |
| JP | 2007-245995 A | 9/2007 |
| JP | 2011-79379 A | 4/2011 |
| JP | 2013-215017 A | 10/2013 |
| WO | 2013/005783 A1 | 1/2013 |

* cited by examiner

VEHICLE

TECHNICAL FIELD

The present invention relates to a vehicle in which at least one of the front wheel pair (left front wheel and right front wheel) and the rear wheel pair (left rear wheel and right rear wheel) thereof is driven by left and right electric motors.

BACKGROUND ART

In Japanese Laid-Open Patent Publication No. 05-111111 (hereinafter referred to as JP1993-111111A), an electric automobile is disclosed in which driving motors are driven from a battery through a drive circuit (see FIG. 1). In this case, drive forces that are generated by the drive motors are controlled by the drive circuit being controlled from a controller.

According to JP1993-111111A, if the temperature of the battery decreases lower than a normal temperature (30° C. according to JP1993-111111A), it is considered that the residual capacity (charge amount) of the battery may be lowered, and therefore to protect the battery from excessive discharge, a configuration is disclosed in which, responsive to a decrease in the temperature of the battery, the drive forces generated by the motors are controlled by a controller through the drive circuit (see FIGS. 2 and 3).

In Japanese Laid-Open Patent Publication No. 2007-245896 (hereinafter referred to as JP2007-245896A), an all wheel drive (four wheel drive) vehicle is disclosed in which, for example, the front wheels are driven by motive power from an engine, whereas the rear wheels are driven by motive power from an electric motor (see FIG. 1). Electric power, which is generated by a dedicated generator driven by rotary output torque from the engine, is supplied to the electric motor that drives the rear wheels.

According to the disclosure of JP2007-245896A, in the event that excessive slippage occurs in the front wheels that are driven by the engine, in order to suppress such excessive slippage, the acceleration is suppressed by reducing the rotary output torque of the engine, and a sharp decrease in a falling speed of a motor torque command value is prevented. As a result, an abnormal increase in the voltage of the dedicated generator can be prevented from occurring (see, paragraphs [0004], [0011], and [0033]).

In Japanese Laid-Open Patent Publication No. 2013-215017 (hereinafter referred to as JP2013-215017A), a vehicle is disclosed in which one of the front wheel pair (left front wheel and right front wheel) and the rear wheel pair (left rear wheel and right rear wheel) is driven (see, FIG. 1 and paragraph [0127]).

In JP2013-215017A, a vehicle drive apparatus is disclosed in which, during a time that the rear wheels (left rear wheel and right rear wheel) are being driven, when an excessive slip occurs in one of the rear wheels, the drive torque of the rear wheel in which the excessive slip occurs is reduced, together with partially reducing the drive torque of the other rear wheel so that a yaw moment will not be generated. Further, so that the driving force of the vehicle does not decrease, a reduced drive torque is distributed to the front wheels (left front wheel and right front wheel) (See, paragraphs [0082] to [0085] and FIGS. 20(a), 20(b), 20(c)).

According to JP2013-215017A, it is disclosed that, since the vehicle drive apparatus is capable of transmitting a sufficient torque to the road surface in response to a driver request, even on a split μ road, the running performance of the vehicle can be maintained (see, Abstract).

In Japanese Laid-Open Patent Publication No. 2011-079379 (hereinafter referred to as JP2011-079379A), a hybrid vehicle drive apparatus is disclosed, which is equipped with a transmission that is switched by a double clutch located between an internal combustion engine and an electric motor, and in which the internal combustion engine is connected in series to the electric motor (FIGS. 1 and 14).

SUMMARY OF INVENTION

Incidentally, the technology to protect the battery accompanying a decrease in temperature, as disclosed in JP1993-111111A, and the technology to suppress an abnormal rise in the voltage of a dedicated generator, as disclosed in JP2007-245896A, cannot be applied as is with respect to the vehicle disclosed in JP2013-215017A, in which one of the front wheel pair (left front wheel and right front wheel) and the rear wheel pair (left front wheel and left rear wheel) is driven by left and right motors. This is because, in each of JP1993-111111A and JP2007-245896A, a single electric motor is used for driving the wheels.

The present invention has been devised in consideration of the technologies and problems noted above, and has the object of providing a vehicle in which, during implementation of a traction control process or the like, an electrical storage device can reliably be protected with a simple structure, in a vehicle for which an output electric power of the electrical storage device is defined as an input electric power, and in which a generated electric power of a generator, which is connected mechanically to an internal combustion engine, is input to a left electric motor that is connected mechanically to a left vehicle wheel, to a right electric motor that is connected mechanically to a right vehicle wheel, and to the electrical storage device.

A vehicle according to the present invention is a vehicle in which at least one of a front wheel pair and a rear wheel pair thereof is driven. The vehicle comprises a left electric motor connected mechanically to a left vehicle wheel, a right electric motor connected mechanically to a right vehicle wheel, a generator connected mechanically to an internal combustion engine, an electrical storage device connected electrically to the left electric motor, the right electric motor, and the generator, and a motor controller configured to control motive power generated by the left electric motor and the right electric motor. On the basis of an allowable input/output electric power of the electrical storage device, a generated electric power of the generator, and a left and right total electric power consumed or generated by the left electric motor and the right electric motor together, the motor controller is configured to determine an allowable electric power variation range, which is an allowable variation range for the left and right total electric power, and then based on a value obtained by dividing into equal parts the allowable electric power variation range, the motor controller is configured to separately and independently control the motive power of the left electric motor and the right electric motor.

According to the invention, two electric motors made up of the left electric motor and the right electric motor are handled at once in an integrated manner, whereby on the basis of the left and right total electric power, a total allowable electric power variation range of the two electric motors is determined. Further, since the motive powers of the respective electric motors are controlled separately and independently based on the value, which serves as a constraint, obtained by dividing the allowable electric power variation range into equal parts, the allowable input/output electric power of the electrical storage device can reliably be protected, and an increase in complexity of the controls for the respective electric motors can be prevented.

In this case, a configuration may be provided in which the allowable input/output electric power is an allowable input electric power, and the allowable electric power variation range is an allowable electric power decrease range, the vehicle further comprising a charge amount controller configured to control a charge amount of the electrical storage device, wherein the charge amount controller is configured to lower a target value of the charge amount in response to a decrease in the allowable input electric power.

If such a configuration is provided, since the allowable input voltage becomes larger as the charge amount of the electrical storage amount becomes lower, by lowering the target value of the charge amount of the electrical storage device responsive to a decrease in the allowable input electric power, a larger allowable electric power decrease range, i.e., a larger torque down amount of the left electric motor and the right electric motor, can be secured.

In this case, assuming that the allowable electric power decrease range is represented by TD, the motor controller may be configured to determine the allowable electric power decrease range TD in accordance with the inequality $TD \leq -X+Y+Z+L$, where X represents the generated electric power of the generator, Y represents the left and right total electric power, Z represents the allowable input electric power, and L represents the consumed electric power of an auxiliary electrical device configured to consume electric power of the electrical storage device.

In this manner, the control is simplified because the allowable electric power decrease range [kW] may be controlled to fit a constraint condition in which the allowable electric power decrease range is equal to or less than −(the generated electric power of the generator) [kW]+the left and right total electric power [kW] of the left and right motors+the allowable input electric power [kW] to the electrical storage device+the consumed electric power [kW] of the auxiliary electrical device.

Furthermore, at a time that the temperature of the electrical storage device decreases, the charge amount controller preferably lowers the target value of the charge amount of the electrical storage device.

When the temperature of the electrical storage device becomes lower, the amount of decrease in the allowable input electric power, which pertains to the constraint on the torque down amount of the electrical storage device, can be reduced.

Further still, at a time that temperature of the electrical storage device decreases, the motor controller is configured to lower a limit value of the left and right total electric power, whereby the electric storage device can be reliably protected, and thus there is never an insufficiency in the torque down amount, which serves as a traction control amount, for example, at a time of slippage.

According to such a configuration, at a time that the temperature of the storage device decreases, the vehicle according to the present invention comprises an electric motor connected mechanically to a wheel, a generator connected mechanically to an internal combustion engine, an electrical storage device connected electrically to the electric motor and the generator, a motive power controller configured to control motive power generated by the electric motor, and a motive power adjusting device configured to adjust the motive power generated by the electric motor, within a range in which a sign thereof is not reversed, at a time that an excessive slip, which is equal to or greater than a predetermined slip amount, occurs in the wheel. Further, on the basis of a temperature of the electrical storage device or an allowable input/output electric power of the electrical storage device, the motive power controller is configured to control the motive power that is generated by the electric motor, and the motive power adjusting device is configured to adjust, within a range in which a sign thereof is not reversed, but otherwise without limitation, the motive power generated by the electric motor.

According to the present invention, when excessive slippage is generated, so that damage to the electrical storage device due to excessive discharge or excessive charging thereof does not occur regardless of the degree to which the electric motor is subject to torque down, the torque itself, which is the motive power generated by the motor, is constricted (motive power is limited), whereby the electrical storage device can reliably be protected, and the traction control amount is never insufficient. In this case, even though it is possible to protect the electrical storage device by reducing the generated electric power amount of the generator in a coordinated manner with the decrease (torque down) of the torque, which is the motive power generated by the motor, according to the present invention, it is unnecessary for such a complex cooperative control to be utilized.

According to the invention, two electric motors made up of the left electric motor and the right electric motor are handled at once in an integrated manner, whereby on the basis of the left and right total electric power, a total allowable electric power variation range of the two electric motors is determined. Further, since the motive powers of the respective electric motors are controlled based on the value, which serves as a constraint, obtained by dividing the allowable electric power variation range into equal parts, the allowable input/output electric power of the electrical storage device can reliably be protected, and an increase in complexity of the controls for the respective electric motors can be prevented.

Further, according to the present invention, an effect is realized in which, when excessive slippage is generated, so that damage to the electrical storage device due to excessive discharge or excessive charging thereof does not occur, regardless of the degree to which the electric motor is subjected to torque down, the torque itself, which is the motive power generated by the motor, is constricted, whereby the electrical storage device can reliably be protected, and the traction control amount is never insufficient. In this case, even though it is possible to protect the electrical storage device by reducing the generated electric power amount of the generator in a coordinated manner with the decrease (torque down) of the torque, which is the motive power generated by the motor, according to the present invention, such a complex cooperative control can be rendered unnecessary.

DESCRIPTION OF EMBODIMENTS

Figure 1:
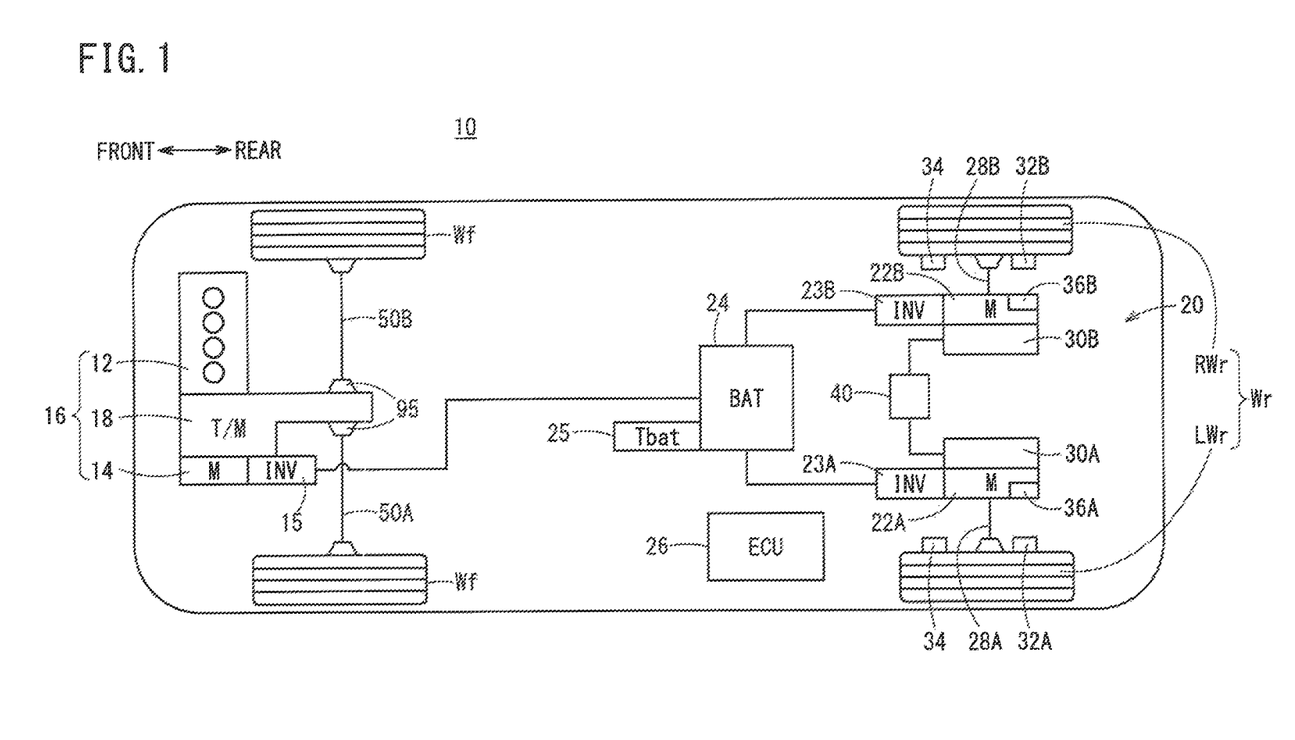
FIG. 1 is a block diagram showing a schematic configuration of a vehicle according to an embodiment of the present invention in which a vehicle drive apparatus can be incorporated.

FIG. 1 is a block diagram showing a schematic configuration of a vehicle 10 according to an embodiment of the present invention.

The vehicle 10 is a hybrid vehicle having a drive apparatus 16 (second drive apparatus, hereinafter referred to as a front wheel drive apparatus) in which an electric motor (M) 14 is connected in series with an internal combustion engine 12 through a transmission (T/M) 18. Motive power from the internal combustion engine 12 and the electric motor 14 is transmitted to the front wheels Wf through the transmission 18, whereas motive power of another drive apparatus 20 (first drive apparatus, hereinafter referred to as a rear wheel drive apparatus), which is disposed on a rearward portion of the vehicle separately from the front wheel drive apparatus 16, is transmitted to the rear wheels Wr (RWr, LWr).

The electric motor 14 of the front wheel drive apparatus 16 and first and second electric motors (M) 22A, 22B (left and right electric motors) of the rear wheel drive apparatus 20 are each connected electrically and respectively to a battery (BAT) 24 through inverters (INV) 15, 23A, 23B, which function as DC-AC converters in which switching elements are connected in the form of a three-phase full-bridge, to thereby enable both supply of electric power from the battery 24 and energy regeneration to the battery 24. The battery 24 is an electrical storage (energy storage) device, which apart from secondary batteries such as a nickel metal hydride (nickel hydrogen) battery and a lithium ion battery, can be replaced by a capacitor. In the present embodiment, the battery 24 is a lithium ion secondary battery. Further, a battery temperature detector 25, which detects the battery temperature Tb, is provided in the battery 24.

The respective structural elements of the vehicle 10 are controlled by an ECU (electronic control unit) 26 that serves as a control device. As is well known, the ECU 26 includes a microcomputer, and on the basis of information from various sensors (various detectors), a CPU thereof operates as various functional means (various functional units) by executing one or more programs to implement various operations. The ECU 26 may be used in the form of a single unit or as a plurality of units. To avoid complexity and for the sake of convenience, in the present embodiment, a single ECU 26 will be described.

Under the control of the ECU 26, the vehicle 10 is capable of being driven in a rear wheel drive mode, in which only the rear wheels Wr are driven by the rear wheel drive apparatus 20, in a front wheel drive mode, in which only the front wheels Wf are driven by the front wheel drive apparatus 16, and in an all wheel drive mode (AWD, four-wheel drive mode (4WD)), in which driving of the rear wheels Wr by the rear wheel drive apparatus 20 and driving of the front wheels Wf by the front wheel drive apparatus 16 are both used in combination.

In the rear wheel drive mode, the rear wheels Wr are driven by the first and/or second electric motors 22A, 22B, and in the front wheel drive mode, the front wheels Wf are driven by the internal combustion engine 12 and/or the electric motor 14.

[Description of Rear Wheel Drive Apparatus 20]

The rear wheel drive apparatus 20 includes axles 28A, 28B. The axles 28A, 28B are left and right axles on respective sides of the rear wheels Wr of the vehicle 10, which are arranged coaxially in a vehicle widthwise direction. Since structural details of the rear wheel drive apparatus 20 including the first and second electric motors 22A, 22B are disclosed, for example, in JP2013-215017A, in order to avoid complexity and to facilitate understanding, the rear wheel drive apparatus 20 will be described only to the extent necessary to enable understanding of the present invention.

In the rear wheel drive apparatus 20, the first and second electric motors 22A, 22B for driving the axles, and speed reducing gears 30A, 30B for decelerating the drive rotation of the first and second electric motors 22A, 22B are disposed coaxially with the axles 28A, 28B. In the speed reducing gears 30A, 30B, there are incorporated a hydraulic brake that is driven by an electric oil pump 40, and a one-way clutch for transmitting motive power (forward driving forces) of the first and second electric motors 22A, 22B in a forward direction to the axles 28A, 28B.

The first electric motor 22A functions as a left electric motor for driving the left rear wheel LWr, and the second electric motor 22B functions as a right electric motor for driving the right rear wheel RWr.

In the rear wheels Wr, there are provided wheel speed sensors 32A, 32B, which detect the speed of rotation of the left rear wheel LWr and the right rear wheel RWr, and slip acquisition devices 34 that are capable of obtaining information concerning generation of an acceleration slip or a deceleration slip (hereinafter also referred to simply as a "slip" or an "excessive slip"), which is equal to or greater than a predetermined amount, in the left rear wheel LWr and the right rear wheel RWr.

In the first and second electric motors 22A, 22B, there are disposed resolvers 36A, 36B that serve as rotational speed detectors for detecting the rotational speeds, etc., of the first and second electric motors 22A, 22B.

In addition to the rotational speeds of the left and right rear wheels LWr, RWr, which are obtained from the wheel speed sensors 32A, 32B, and the rotational speeds of the first and second electric motors 22A, 22B, which are obtained from the resolvers 36A, 36B, a steering angle, an accelerator pedal opening AP, a shift position, a charge state SOC (also referred to as a storage amount or residual capacity, which typically is represented as a percentage of the full charge capacity at 100%) of the battery 24, and various oil temperatures, etc., are input to the ECU 26. On the other hand, signals for controlling the front wheel drive apparatus 16 including the internal combustion engine 12 and the electric motor 14, and signals for controlling the rear wheel drive apparatus 20 including the first and second electric motors 22A, 22B are output from the ECU 26.

[Description of Front Wheel Drive Apparatus 16]

Figure 2:
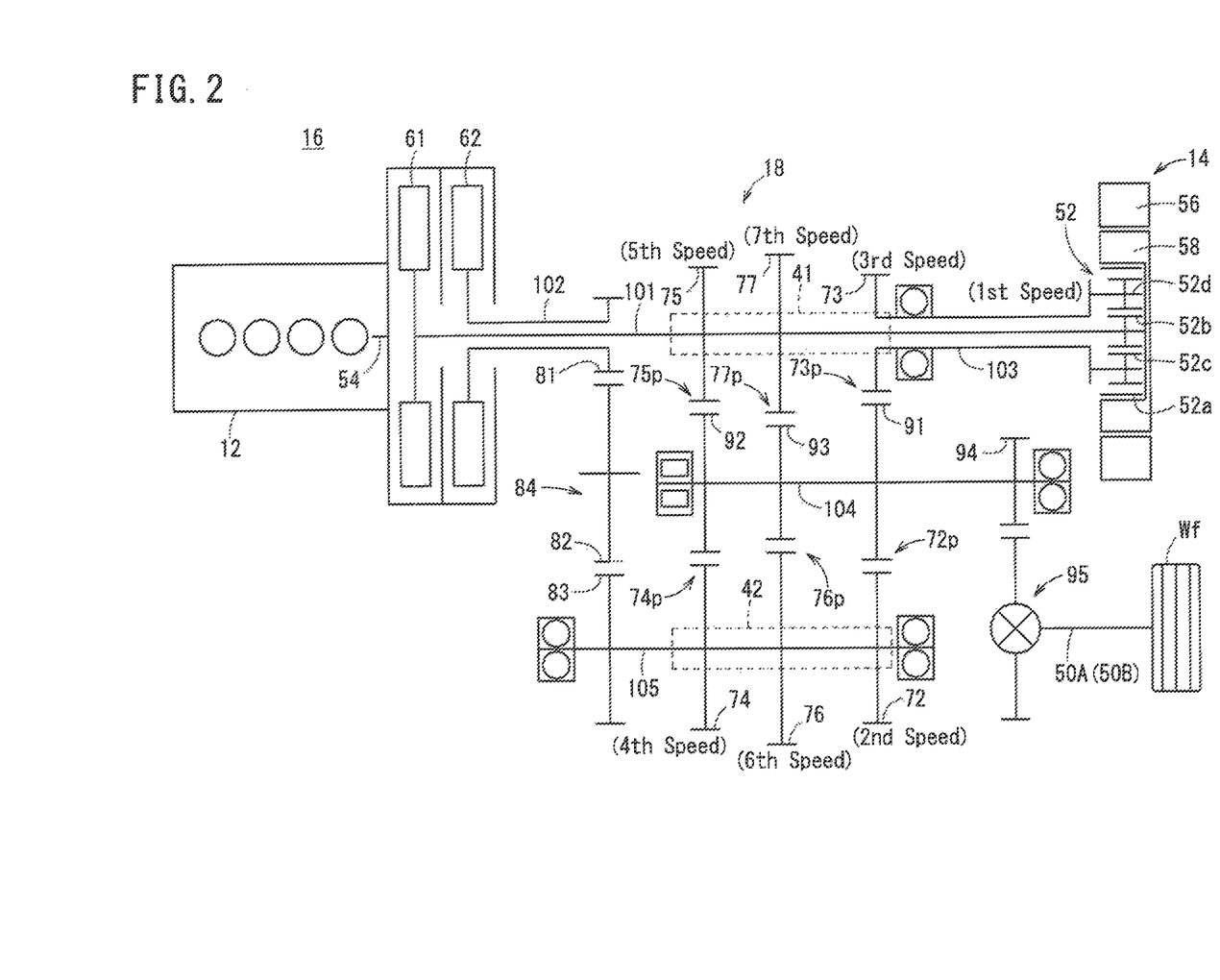
FIG. 2 is a schematic diagram of a front wheel drive apparatus in the vehicle of FIG. 1.

FIG. 2 is a schematic diagram of the front wheel drive apparatus 16. Since structural details of the front wheel drive apparatus 16 are disclosed, for example, in FIGS. 1 and 14 of JP2011-079379A, in order to avoid complexity and to facilitate understanding, the front wheel drive apparatus 16 will be described only to the extent necessary to enable understanding of the present invention.

The front wheel drive apparatus 16 is equipped with the internal combustion engine 12 that serves as a drive source, the electric motor 14 that functions as a drive source, an auxiliary drive source, or a generator, the transmission 18 for transmitting motive power from the drive source or the auxiliary drive source to the front wheels Wf, and a planetary gear mechanism 52 that serves as a differential speed reducer and constitutes part of the transmission 18.

The electric motor 14 is a three-phase brushless synchronous motor including a stator 56 with coils wound around a stator core thereof, and a rotor 58 in which permanent magnets, which are arranged in facing relation to the stator 56, are incorporated.

The planetary gear mechanism 52 includes a ring gear 52a, a planetary gear 52c, a planetary carrier 52d, and a sun gear 52b connected to the rotor 58.

The transmission 18 is a so-called double clutch transmission, which is equipped with a first clutch 61 (first engaging/disengaging unit) and a second clutch 62 (second engaging/disengaging unit) disposed on a crank shaft 54 of the internal combustion engine 12, a multiple speed-changing gear group including the planetary gear mechanism 52, and a first shift actuator (first speed-changing unit, first speed-changing shifter/synchronizer) 41 and a second shift actuator (second speed-changing unit, second speed-changing shifter/synchronizer) 42 for switching (gear switching) between gears of the aforementioned speed-changing gear group.

The transmission 18 comprises a first main shaft (also referred to as a first main shaft) 101 disposed coaxially with the crank shaft 54 of the internal combustion engine 12 and to which motive power from the internal combustion engine 12 is directly transmitted through the first clutch 61, and a hollow connecting shaft 103 (also referred to as a second first main shaft 103) to which motive power from the internal combustion engine 12 is transmitted through the first main shaft 101, the sun gear 52b, the planetary gear 52c, and the planetary carrier 52d. In addition, the transmission 18 comprises a second main shaft (also referred to as a first second main shaft) 102 to which motive power from the internal combustion engine 12 is transmitted through the second clutch 62, an idle gear train 84 (made up from an idle drive gear 81, a first idle driven gear 82, and a second idle driven gear 83) connected to the second main shaft 102, and a second main shaft (also referred to as a second main shaft, or an intermediate shaft) 105 provided as a rotating shaft of the second idle driven gear 83. The transmission 18 further comprises a counter shaft (also referred to as an output shaft) 104, which is disposed in parallel with the first main shafts 101, 103 and the second main shafts 102, 105, and drives the front wheels Wf through a differential gear mechanism 95 via an axle 50A (50B).

Furthermore, in the transmission 18, there is provided on the first and second first main shafts 101, 103 (first input shafts), which is one of the transmission shafts (odd-numbered transmission shaft) of two transmission shafts, an odd-numbered stage gear group (first gear group) made up from a fifth speed drive gear 75, a seventh speed drive gear 77, and a third speed drive gear 73. Further, there is provided on the first and second main shafts 102, 105 (second input shafts), which is the other one of the transmission shafts (even-numbered transmission shaft), an even-numbered stage gear group (second gear group) made up from a second speed drive gear 72, a fourth speed drive gear 74, and a sixth speed drive gear 76.

In this manner, in the first shift actuator 41, the fifth speed drive gear 75, the seventh speed drive gear 77, and the third speed drive gear 73, which are not fixed to the first main shafts 101, 103 (although in FIG. 2, for purposes of convenience, the gears are shown as being fixed thereto) are selectively connected to or released from the first main shafts 101, 103.

In the second shift actuator 42, the fourth speed drive gear 74, the sixth speed drive gear 76, and the second speed drive gear 72, which are not fixed to the second main shaft 105 (although in FIG. 2, for purposes of convenience, the gears are shown as being fixed thereto), are selectively connected to or released from the second main shaft 105.

A first shared driven gear 91 provided on the counter shaft 104 engages with the third speed drive gear 73 and makes up a third speed gear pair 73p together with the third speed drive gear 73, and further engages with the second speed drive gear 72 and makes up a second speed gear pair 72p together with the second speed drive gear 72.

A second shared driven gear 92 provided on the counter shaft 104 engages with the fifth speed drive gear 75 and makes up a fifth speed gear pair 75p together with the fifth speed drive gear 75, and further engages with the fourth speed drive gear 74 and makes up a fourth speed gear pair 74p together with the fourth speed drive gear 74.

A third shared driven gear 93 provided on the counter shaft 104 engages with the seventh speed drive gear 77 and makes up a seventh speed gear pair 77p together with the seventh speed drive gear 77, and further engages with the sixth speed drive gear 76 and makes up a sixth speed gear pair 76p together with the sixth speed drive gear 76.

When the ECU 26 clamps the first clutch 61, the internal combustion engine 12 is connected to the first main shaft 101, which is an odd-numbered transmission shaft of the transmission 18, and through the first main shaft 101, is connected to the rotor 58 of the electric motor 14, and thus becomes capable of driving the electric motor 14 as a generator.

Further, when the electric motor 14 is driven as a generator, the internal combustion engine 12 carries out transmission of torque with respect to the front wheels Wf through the counter shaft 104, using any one of the third, fifth, or seventh speed gears (third speed drive gear 73, fifth speed drive gear 75, seventh speed drive gear 77).

Furthermore, when the ECU 26 clamps the second clutch 62, the internal combustion engine 12 is connected to the first and second main shafts 102, 105, which are even-numbered transmission shafts of the transmission 18, and the internal combustion engine 12 carries out transmission of torque with respect to the front wheels Wf through the counter shaft 104, using any one of the second, fourth, or sixth speed gears (second speed drive gear 72, fourth speed drive gear 74, sixth speed drive gear 76).

On the other hand, when the ECU 26 has released the first and second clutches 61, 62, and the electric motor 14 is operated as a motor, the rotational drive force of the rotor 58 is connected through the planetary gear mechanism 52 to the first main shaft 101, which is an odd-numbered transmission shaft of the transmission 18, and the electric motor 14 is made capable of carrying out torque transmission with respect to the front wheels Wf through the counter shaft 104, using any one of the third, fifth, or seventh gears (third speed drive gear 73, fifth speed drive gear 75, seventh speed drive gear 77). Moreover, when the electric motor 14 carries out torque transmission with respect to the front wheels Wf, as well as when electric power regeneration from the front wheels Wf is performed, both the first and second clutches 61, 62 are released, and the mechanical connection with the internal combustion engine 12 is blocked to improve efficiency.

A final gear 94 provided on the counter shaft 104 is utilized in common with the odd-numbered third speed, fifth speed, and seventh speed drive gears 73, 75, 77, and the even-numbered second speed, fourth speed, and sixth speed drive gears 72, 74, 76.

According to the present embodiment, to avoid complexity, shifting of the odd-numbered gear stages is controlled by the first shift actuator 41, including shifting control of the first speed for operating the planetary gear mechanism 52.

The rotor 58 of the electric motor 14 is directly connected to the first speed sun gear 52b, whereby an assist with respect to the motive power of the internal combustion engine 12 is carried out from the odd-numbered side. Stated otherwise, when the even-numbered gears are used (when the second clutch 62 is clamped), since the first clutch 61 of the odd-numbered side is released, an assist (motive power transmission) is made possible in which a first speed drive gear (the planetary gear mechanism 52 and the third speed drive gear 73), the fifth speed drive gear 75, and the seventh speed drive gear 77 are used.

During regenerative electric power generation or electric motor driving (EV driving), the first and second clutches 61, 62 are disengaged, and although the internal combustion engine 12 is completely decoupled, motive power transmission from the electric motor 14 is only carried out from the odd-numbered gears, and therefore, the regenerative electric power generation and electric motor driving are performed only at odd-numbered speeds. Moreover, upon starting, as a rule, it is only possible for an odd-numbered speed to be used (typically, starting is effected using the first speed drive gear).

With the double clutch transmission 18, which is constructed in the foregoing manner, in a so-called pre-shift state in which the transmission gear of a next lower speed or a next higher speed is placed (set) in a waiting state beforehand by the first and second shift actuators 41, 42, high speed gear shifting is implemented by alternately connecting (engaging/disengaging, clamping or releasing) the first and second clutches 61, 62.

[Motor Traction Control]

The ECU 26 controls the front wheel drive apparatus 16 and the rear wheel drive apparatus 20 to suit them to each of respective vehicle conditions. In particular, the rear wheel drive apparatus 20 also functions as a motor controller including a motor traction control system (M-TCS) that carries out a motor traction control for controlling slippage of the rear wheels Wr on the basis of the wheel rotational speed of the rear wheels Wr or the motor rotational speed of the first and second electric motors 22A, 22B. When the motor traction control is implemented, the torques generated by the first and second electric motors 22A, 22B are controlled, and the rotating states of the left and right rear wheels LWr, RWr are controlled.

In greater detail, in a vehicle 10 in which at least one of the front wheel pair (front wheels Wf) and the rear wheel pair (rear wheels Wr) (in the present embodiment, both the front wheels Wf and the rear wheels Wr) is driven, the vehicle 10 is equipped with the first and second electric motors 22A, 22B, which are connected mechanically to the rear wheels Wr, a generator (motor 14), which is connected mechanically to the internal combustion engine 12, the battery 24, which is connected electrically to the generator (motor 14) and the first and second electric motors 22A, 22B, an ECU (hereinafter referred to as a "motive power control ECU" as needed) 26 that functions as a motive power control device for controlling the motive power generated by the first and second electric motors 22A, 22B, and an ECU (hereinafter referred to as a "motive power adjusting ECU" as necessary) 26 that functions as a motive power adjusting device, which adjusts, within a range in which a sign thereof is not reversed, or stated otherwise, within a range in which the motive power is not reversed in direction, the motive power (motive power in a forward direction) generated by the first and second electric motors 22A, 22B when an excessive slip, which is equal to or greater than a predetermined amount, is generated in the rear wheels Wr.

Next, with reference to the schematic block diagram of FIG. 3, which illustrates the electric power distribution of the vehicle 10, protective operations carried out by the ECU 26 with respect to the battery 24 will be described, in a state in which the rear wheels Wr of the vehicle 10 are driven by the first and second electric motors 22A, 22B, and with the motor traction control system, which forms an essential part of the present invention, being in a state of operation.

Figure 3:
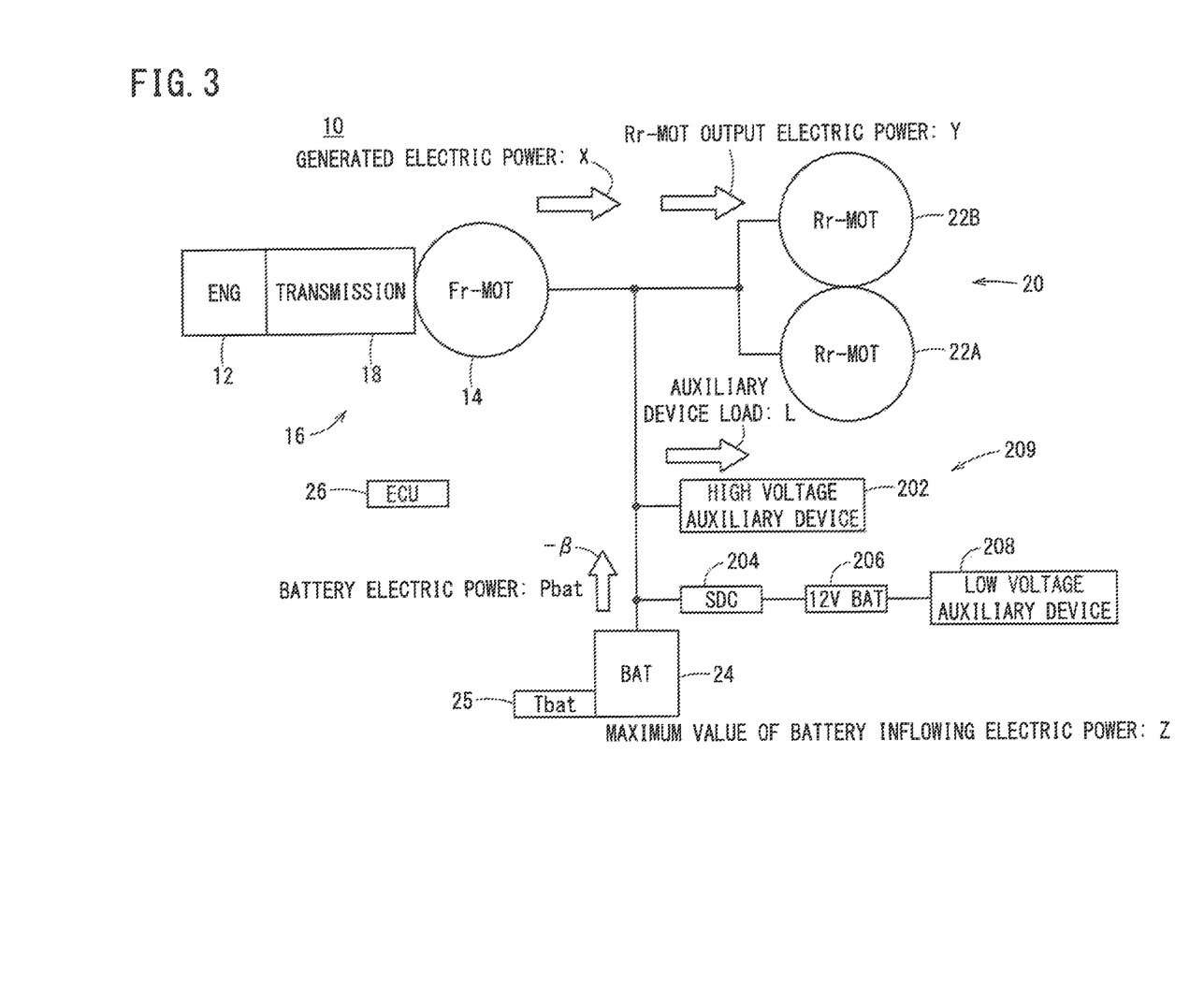
FIG. 3 is a schematic block diagram for describing electric power distribution during implementation of a motor traction control.

As shown in FIG. 3, the electric motor 14 (described by Fr-MOT (front wheel drive motor) in FIG. 3, since it is a motor on the side of the front wheels Wf) is connected with respect to the internal combustion engine 12 (described by ENG) of the vehicle 10 through the aforementioned double clutch type transmission 18. Generated electric power Pgen of the electric motor 14, which operates as a generator, is defined by Pgen=X [kW].

The battery electric power Pbat [kW] of the battery 24 is defined so as to be operated at an outflowing electric power of −β [kW]. The outflowing electric power is a discharging electric power, whereas the inflowing electric power is a charging electric power. A convention is adopted in which the battery electric power Pbat [kW] is negative on the discharging side, and is positive on the charging side. Accordingly, the outflowing electric power −β indicates a discharging electric power.

The left and right total electric power Pmot, which is made up of a consumed electric power Pmot1 [kW] of the first electric motor 22A that drives the left rear wheels LWr (referred to by Rr-MOT (rear wheel drive motor) in FIG. 3, since it is a motor on the side of the rear wheels Wr) and a consumed electric power Pmot2 of the second electric motor 22B (Rr-MOT) that drives the right rear wheels RWr, is defined by Pmot=Y [kW] (also referred to as an Rr-MOT output electric power).

The value of an auxiliary (accessory) device load electric power P1 [kW] of auxiliary devices, which are connected to the battery 24 and made up from a high voltage auxiliary device 202, such as an air conditioner or the like, and a low voltage auxiliary device 208 together with a 12 V battery 206 connected through a step down converter 204, is defined by P1=L [kW] (consumed electric power of auxiliary electrical devices).

The battery 24 includes a limit on the inflowing and outflowing electric power corresponding to the state of charge SOC [%] thereof. In particular, at a time of low temperature, as shown in FIG. 4, with the maximum value of the battery outflowing electric power −Pdmax [KW] and the maximum value of the battery inflowing electric power Pcmax [kW] being indicated on the vertical axis, the battery has a rated limit value corresponding to the SOC [%], as shown on the horizontal axis.

Figure 4:
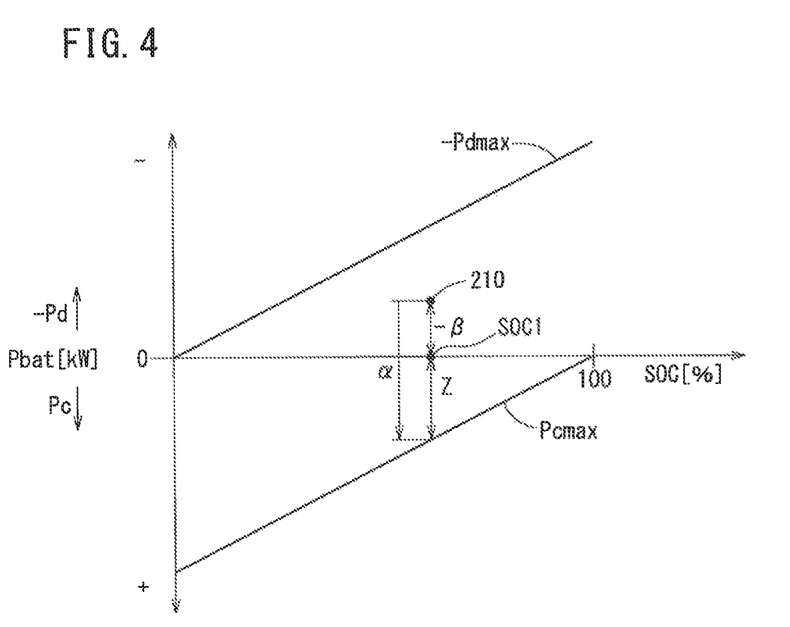
FIG. 4 is a characteristic diagram for describing protection of a battery under the motor traction control.

Further, the maximum value of the battery inflowing electric power Pcmax, which is a rated limit value in the positive direction, i.e., a current inflowing direction (a downward direction as shown in FIG. 4) when the charge amount SOC is SOC=SOC1, is defined by Pcmax=Z [kW] (referred to as an allowable input electric power).

As shown in FIG. 4, the absolute value of the maximum value of the battery outflowing electric power −Pdmax, which is a possible discharge electric power value, increases linearly from 0 [kW] corresponding to an increase from 0 [%] to 100 [%] of the SOC [%], and the absolute value of the battery inflowing electric power Pcmax [kW], which is a possible charging electric power value, increases linearly from 0 [kW] corresponding to a decrease from 100 [%] to 0 [%] of the SOC [%]. Actually, within a short time on the order of a few seconds, it is also possible for a value in excess of the rated limit value (a discharge electric power greater than −Pdmax, a charging electric power greater than Pcmax) to be used.

As shown in FIG. 4, at a charge amount SOC [%] of SOC=SOC1 [%], when the battery electric power Pbat [kW] at an operating point 210 of the battery 24 is such that Pbat=−β [kW], in preparation for a case, e.g., in which an excessive slip in excess of a threshold slip amount is detected in either one of the left rear wheel LWr or the right rear wheel RWr by the slip acquisition devices 34 (FIG. 1), the ECU 26 calculates beforehand a constraint condition of the torque down amount TD [kW] for commanding the first and second electric motors 22A, 22B.

The torque down amount TD [kW] is represented by the following equations (1), which are indicative of a difference when the left and right total electric power of the first and second electric motors 22A, 22B Pmot [kW]=Y (prior to change thereof, refer to FIG. 3) decreases such that the left and right total electric power Pmot [kW]=Y' (after change thereof).

$$Y-Y'=TD, Y'=Y-TD \qquad (1)$$

On the other hand, the allowable electric power variation range (width) α [kW] from the battery operating point 210, as shown in FIG. 4, is represented by the following equation (2).

$$\alpha = Z-(-\beta) \qquad (2)$$

As indicated by the following inequality (3), if the allowable electric power variation range α lies within a positive range, the battery inflowing electric power Pc does not exceed the maximum battery inflowing electric power Pcmax (|Pc|≤|Pcmax|).

$$\alpha \geq 0 \qquad (3)$$

More specifically, in order that the battery inflowing electric power Pc does not exceed this limit, it is necessary that the following inequality (4) be satisfied.

$$Z+\beta \geq 0 \qquad (4)$$

Further, as shown in FIG. 3, the outflowing electric power −β [kW] of the battery 24 in equation (2) can be understood from the value of the following equation (5), in which the left and right total electric power Y of the first and second electric motors 22A, 22B, and the auxiliary device load electric power L (consumed electric power of the auxiliary electrical devices) are subtracted from the generated electric power X.

$$-\beta = X-(Y+L) \qquad (5)$$

When equation (5) is substituted for the value of β in the inequality (4) to thereby modify the inequality, the following inequality (6) is obtained.

$$Z \geq X-(Y+L) \qquad (6)$$

Even if the left and right total electric power Y changes to the left and right total electric power Y', since the inequality (6) must be satisfied, when Y' is substituted for Y and the inequality is modified, the following inequality (7) is obtained.

$$Z-X+Y'+L \geq 0 \qquad (7)$$

Solving the inequality (7) for Y' yields the following inequality (8).

$$Y' \geq -Z+X-L \qquad (8)$$

In order to calculate the constraint condition on the torque down amount TD, the equation (Y'=Y−TD) on the right side of the equations (1) is substituted into the inequality (8), to thereby obtain the following inequality (9). Further, solving the inequality (9) for the torque down amount TD, the following inequality (10) is obtained.

$$Y-TD \geq -Z+X-L \qquad (9)$$

$$TD \leq -X+Y+Z+L \qquad (10)$$

In addition, according to the present embodiment, when an excessive slip in either one of the rear wheels Wr occurs, the ECU 26 controls the motive powers of the first electric motor 22A and the second electric motor 22B separately and independently, within a variation range of TD/2 [(TD)/2=(−X+Y+Z+L)/2], which is a value obtained by dividing into equal parts (halving) the torque down amount TD.

At this time, even if the motive powers of both the first electric motor 22A and the second electric motor 22B are each changed by TD/2, which is the maximum value of the variation range, due to the fact that the total variation range thereof naturally does not exceed the torque down amount TD, the left and right total electric power Y' after the change also falls within a predetermined range, and the rated limit value of the charge amount SOC1 in the positive direction of the battery 24 does not exceed the allowable input electric power Z.

In FIG. 4, when the operating point of the battery 24 is on the positive side (the lower side in FIG. 4), the limit on the maximum value of the battery outflowing electric power −Pdmax of the allowable output electric power, which is a rated limit value in the negative direction, i.e., a current outflowing direction (an upward direction in FIG. 4) of the battery 24, can be considered in a similar manner.

[Modification]

Figure 5:
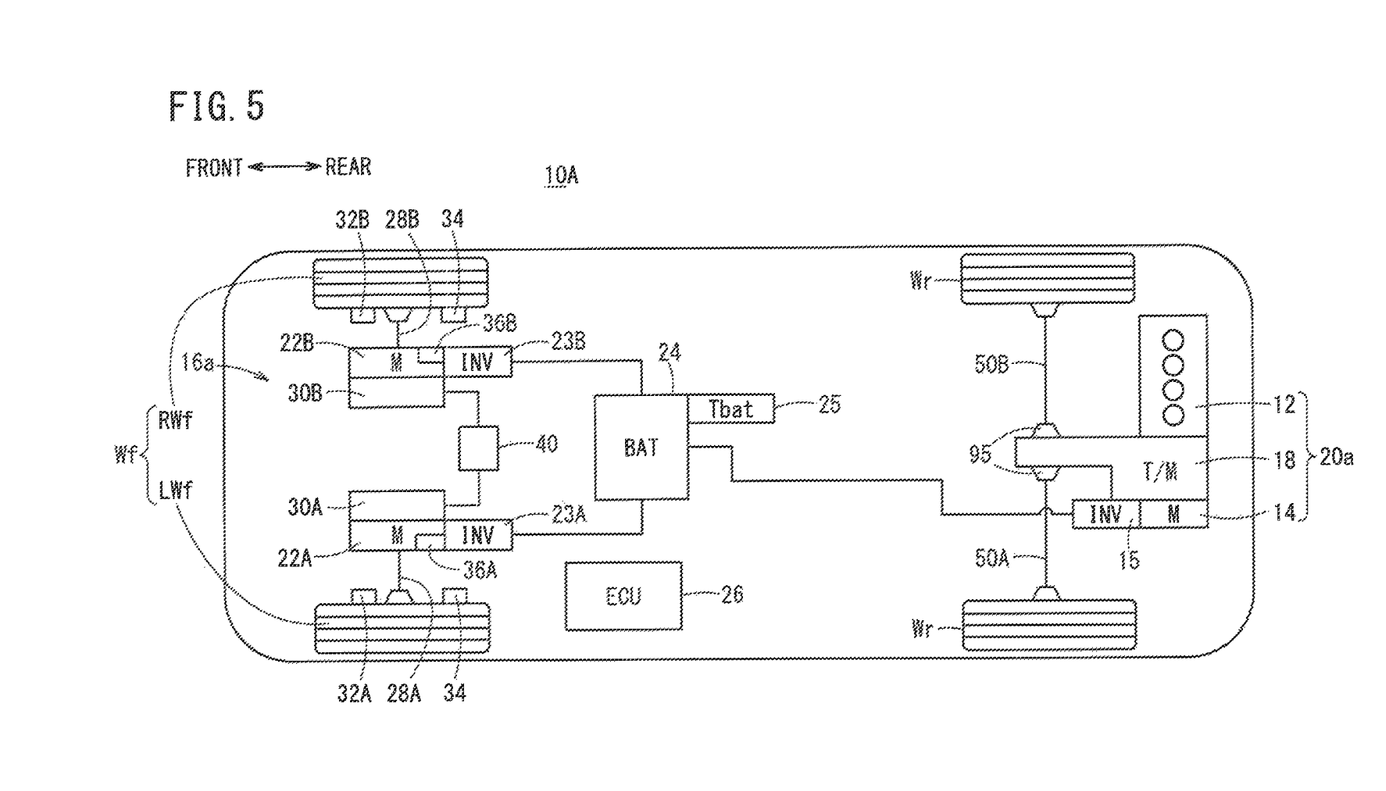
FIG. 5 is a block diagram showing a schematic configuration of a vehicle according to a modified example of the present invention.

FIG. 5 is a block diagram showing a schematic configuration of a vehicle 10A according to a modified example of the present invention. With the vehicle 10A shown in FIG. 5, the configurations of the front wheel drive apparatus 16 and the rear wheel drive apparatus 20 of the vehicle 10 according to the aforementioned embodiment are reversed from front to rear. More specifically, a front wheel drive apparatus 16a of the vehicle 10A comprises the first and second electric motors 22A and 22B, which drive the left and right front wheels Wf (LWf, RWf) that are disposed on the front side of the vehicle 10A. Further, a rear wheel drive apparatus 20a of the vehicle 10A comprises the electric motor 14, which is connected in series through the transmission 18 with the internal combustion engine 12 for driving the rear wheels Wr that are disposed on the rear side of the vehicle 10A. The above-described "motor traction control" can be applied in the same manner with respect to the first and second electric motors 22A, 22B of the vehicle 10A.

Summary of the Embodiments and Other Modifications (1) As described above, the vehicles 10, 10A according to the aforementioned embodiments comprise the first electric motor 22A, which is a left electric motor connected mechanically to a left vehicle wheel (the left rear wheel LWr in the example of FIG. 1, the left front wheel LWf in the example of FIG. 5), the second electric motor 22B, which is a right electric motor connected mechanically to a right vehicle wheel (the right rear wheel RWr in the example of FIG. 1, the right front wheel RWf in the example of FIG. 5), the electric motor 14 that functions as a generator and is connected mechanically to the internal combustion engine 12, the battery 24 that serves as an electrical storage device connected electrically to the first electric motor 22A, the second electric motor 22B, and the electric motor 14 (generator), and the ECU 26 that serves as a motor controller that controls motive power generated by the first and second electric motors 22A, 22B. In the vehicles 10, 10A, at least one of a front wheel pair (front wheels Wf) and a rear wheel pair (rear wheels Wr) is driven.

When an excessive slip is detected in any one of the left or right vehicle wheels that are driven by the first and second electric motors 22A, 22B, on the basis of an allowable input/output electric power (in the above embodiments, an allowable input electric power z) of the battery 24, a generated electric power X of the electric motor 14 (generator), and a left and right total electric power (Rr-MOT output electric power) Y, which is an electric power consumed or generated (in the aforementioned embodiments, a consumed electric power) in total by the first and second electric motors 22A, 22B, the ECU 26 determines the torque down amount TD [kW], which is an allowable variation range (allowable electric power variation range α) for the left and right total electric power Y, and then based on the value TD/2 obtained by dividing the torque down amount TD into equal parts, the ECU 26 respectively controls the motive powers of the first and second electric motors 22A, 22B.

In practice, the ECU 26 steps down the torque by reducing a duty ratio of the switching elements that make up the inverters 23A, 23B (drive force reducer, drive force adjuster, torque reducer, torque adjuster).

In the foregoing manner, according to the embodiments, two electric motors made up of the first and second electric motors 22A, 22B are handled at once in an integrated manner, whereby on the basis of the left and right total electric power Y, the torque down amount TD, which is the total allowable electric power variation range α of the first and second electric motors 22A, 22B, is determined. Further, since the motive powers of the first and second electric motors 22A, 22B are controlled (limited) respectively based on the value, which serves as a constraint obtained by simply dividing the determined torque down amount TD into equal parts, the allowable input/output electric power (in the above embodiments, the allowable input electric power Z) of the battery 24 can reliably be followed, and an increase in complexity of the controls for the first and second electric motors 22A, 22B can be prevented.

(2) In this case, a configuration may be provided in which, more specifically, the allowable input/output electric power is an allowable input electric power Z, and the allowable electric power variation range α is an allowable electric power decrease range, i.e., the torque down amount TD, and further comprising the ECU 26 that functions as a charge amount controller for controlling a charge amount SOC of the battery 24, wherein the ECU 26 lowers a target value of the charge amount SOC to a value lower than the charge amount SOC1.

As shown in FIG. 4, since the allowable input voltage Z becomes larger as the charge amount SOC of the battery 24 becomes lower, by lowering the target value of the charge amount SOC of the battery 24, a larger allowable electric power decrease range, i.e., a larger torque down amount TD of the first and second electric motors 22A, 22B, can be secured.

(3) More specifically, when the constraint condition of the torque down amount TD, which is the allowable electric power decrease range, is determined, the ECU 26 determines the torque down amount TD, which is the allowable electric power decrease range, by the following inequality (10), which is cited again:

$$TD \leq -X + Y + Z + L \quad (10)$$

where X represents the generated electric power of the electric motor 14 (generator), Y represents the left and right total electric power consumed by the first and second electric motors 22A, 22B, Z represents the allowable input electric power, and L represents the electric power of an auxiliary load 209 (consumed electric power of the auxiliary electrical devices) that consumes electric power of the battery 24.

In this manner, the control is simplified because the allowable electric power decrease range (torque down amount TD) [kW] may be controlled to fit the constraint condition in which "the allowable electric power decrease range [kW]≤−(the generated electric power of the generator) [kW]+the left and right total electric power [kW] of the left and right motors which is the total consumed electric power of the left and right motors+the allowable input electric power [kW] to the electrical storage device+the electric power [kW] of the auxiliary load".

Figure 6:
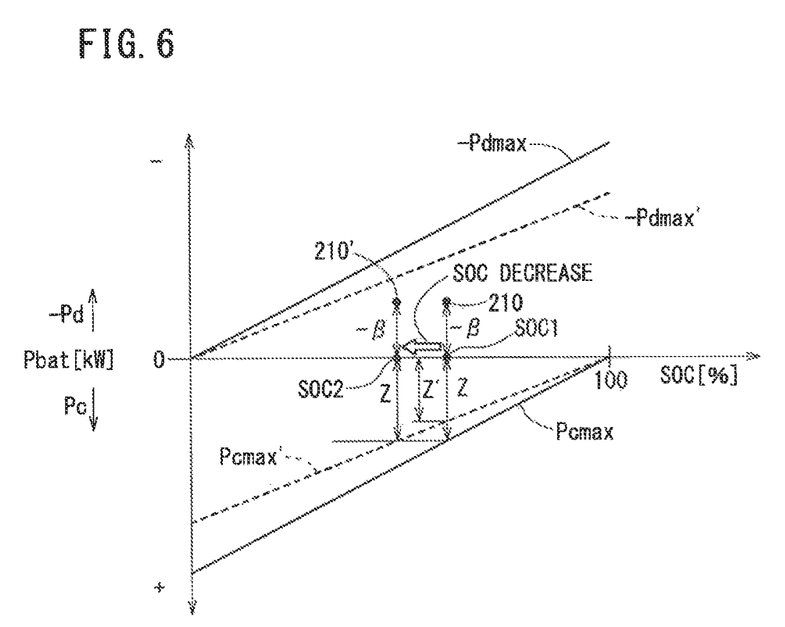
FIG. 6 is a characteristic diagram for describing a motor traction control at a time that the battery temperature decreases.

(4) As shown in FIG. 6, when the temperature of the battery 24 undergoes a further decrease, with respect to the charge amount SOC [%] of the battery 24, as indicated by the dashed lines, the absolute values of the maximum value of the battery outflowing electric power −Pdmax [KW] and the maximum value of the battery inflowing electric power Pcmax [kW], respectively, become smaller values of the maximum value of the battery outflowing electric power −Pdmax' [KW] and the maximum value of the battery inflowing electric power Pcmax' [kW]. In addition, on the right side of the inequality (9), from the value at which the battery electric power Pbat [kW] of the battery 24 is Pbat=0, the allowable input electric power Z becomes reduced to an allowable input electric power Z', whereby the constraint condition of the torque down amount TD becomes a smaller and more stringent value.

Thus, in order to suppress a reduction in the traction control capability, a previously stored characteristic (for example, the maximum battery outflowing electric power value −Pdmax [kW] and the maximum battery inflowing electric power value Pcmax [kW] shown in FIG. 6) responsive to the battery temperature Tbat, which is detected by the battery temperature detector 25, is referred to, and the target value of the charge amount SOC [%] is preferably reduced from the charge amount SOC1 to a target residual capacity value defined by a charge amount SOC2 of a smaller value, such that the allowable input electric power Z' at a time of low temperature returns to the allowable input electric power Z.

If controlled in this manner, when the temperature (battery temperature Tbat) of the battery 24 is further lowered, the amount of decrease in the allowable input electric power Z, which pertains to the constraint on the torque down amount TD of the battery 24, can be reduced.

Figure 7:
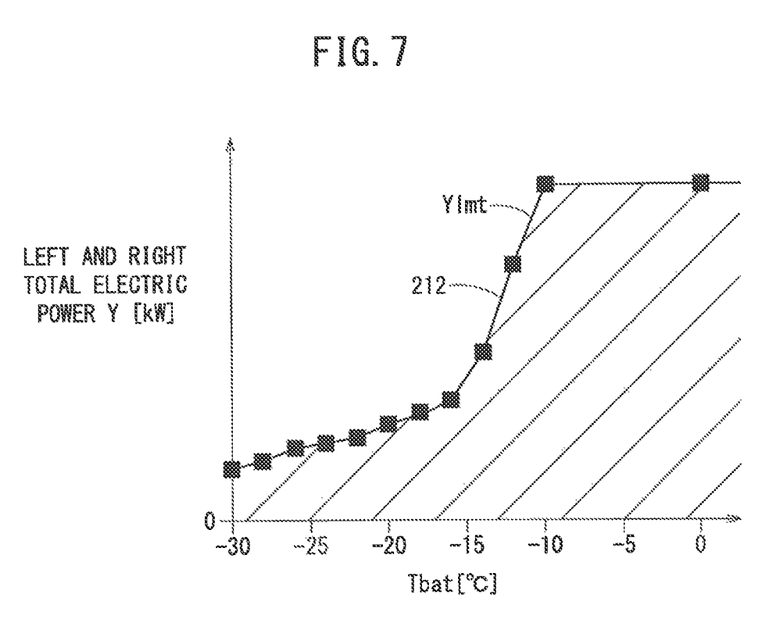
FIG. 7 is a characteristic diagram for describing limiting of a torque down amount and protection of the battery at a time that the battery temperature decreases.

Moreover, as shown by a characteristic curve 212 in FIG. 7, in order to reduce the torque down amount TD under the traction control at times that the battery temperature Tbat is lowered, a left and right total limiting electric power Ylmt, which is a limiting value (maximum value) of the left and right total electric power (Rr-MOT output electric power) Y consumed by the first and second electric motors 22A, 22B, becomes lower corresponding to a decrease in the battery temperature Tbat. Thus, even during times that the battery temperature Tbat of the battery 24 is low, the battery 24 can reliably be protected.

For the left and right total electric power (Rr-MOT output electric power) Y, a value is adopted that lies within a range in which the left and right total limiting electric power Ylmt of the characteristic curve 212 of FIG. 7 is not exceeded. In this case, considering the torque down amount TD after the occurrence of slippage is in proportion to the torque amount at the time that slippage is generated, i.e., to the left and right total electric power (Rr-MOT output electric power) Y, or stated otherwise, considering that the slip amount increases as the left and right total electric power (Rr-MOT output electric power) Y becomes larger, a large torque down amount TD is required at the time of slippage. Thus, prior to the occurrence of slippage, by reducing beforehand the left and right total limiting electric power Ylmt, which is the maximum value that the left and right total electric power (Rr-MOT output electric power) Y can assume, the torque down amount TD after the occurrence of slippage can be made smaller.

Referring to the characteristic curve 212 of FIG. 7, when traction control of the first and second electric motors 22A, 22B is performed at low temperature, the torque itself, which is the motive power currently generated by the first and second electric motors 22A, 22B, is constricted by the left and right total limiting electric power Ylmt, so that damage is not imparted to the battery 24 regardless of the degree to which the first and second electric motors 22A, 22B are subjected to torque down. Thus, the battery 24 can reliably be protected, and the torque down amount TD, which serves as the traction control amount when slippage occurs, is never insufficient.

Further, in the characteristic curve 212 of FIG. 7, although the battery temperature Tbat is indicated on the horizontal axis, in place of the battery temperature Tbat, an allowable input/output electric power of the battery 24, which has a positive correlation to the battery temperature Tbat, may be indicated thereby. In this case, before any slippage occurs, when the allowable input/output electric power of the battery 24 is made smaller, the left and right total limiting electric power Ylmt, which is a limiting value (maximum value) of the left and right total electric power (Rr-MOT output electric power) Y consumed by the first and second electric motors 22A, 22B, may be controlled to become lower beforehand.

If a left and right total limiting electric power determining process (i.e., the process of step S3 in the flowchart of FIG. 8) is adopted in which the characteristic curve 212 of FIG. 7 is used, even though it is possible to protect the battery 24 by reducing the generated electric power amount of the electric motor 14, which functions as a generator, in a coordinated manner with the decrease (torque down) of the torque, which is the motive power generated by the first and second electric motors 22A, 22B, it is unnecessary for a complex cooperative control to be utilized.

Figure 8:
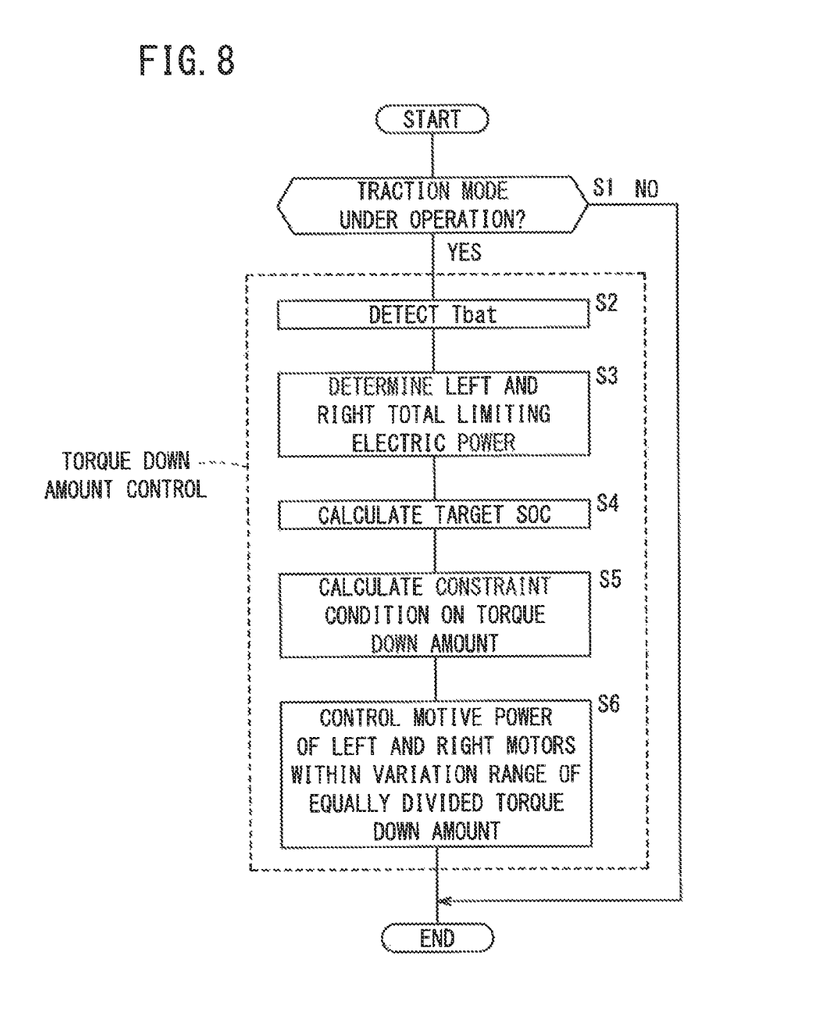
FIG. 8 is a flowchart for describing overall processing of the embodiment of the present invention and the modified example.

Next, describing the aforementioned embodiments and other modifications together with reference to the flowchart in FIG. 8, in step S1, the ECU 26, by way of an output or the like from a non-illustrated ON/OFF switch, detects whether or not a traction mode for carrying out the traction control has been set. If it is judged that such a traction mode (under traction control) has been set (step S1: YES), then the torque down amount control process of steps S2 through S6 is implemented by the ECU 26.

More specifically, in step S2, the battery temperature Tbat is detected. Next, in step S3, the left and right total limiting electric power Ylmt, which is a control value (maximum value) of the left and right total electric power Y [kW] corresponding to the battery temperature Tbat, is determined with reference to the characteristic curve 212 of FIG. 7.

Furthermore, in step S4, as was described with reference to FIG. 6, the target SOC is calculated corresponding to the battery temperature Tbat.

In addition, in step S5, in the inequality (10), based on the left and right total electric power Y, the constraint condition of the torque down amount TD, which is the allowable electric power variation range α of the total of the first and second electric motors 22A, 22B, is calculated beforehand.

Lastly, in step S6, when it is acquired through the slip acquisition devices 34 that an excessive slip in either one of the rear wheels Wr has occurred, the ECU 26 controls the left and right total electric power Y of the first electric motor 22A and the second electric motor 22B separately and independently, within a variation range of TD/2 [(TD)/2=(−X+Y+Z+L)/2], which is a value obtained by dividing into equal parts (halving) the previously calculated torque down amount TD.

The present invention is not limited to the aforementioned embodiments including the vehicles 10, 10A (all wheel drive vehicles), which are capable of operating the electric motor 14 as a generator by the internal combustion engine 12 through the transmission 18, and simultaneously driving the front wheels Wf (or the rear wheels Wr) by the internal combustion engine 12 through the transmission 18, while the rear wheels Wr (or the front wheels Wf) are driven by the first and second electric motors 22A, 22B.

Based on the disclosed content of the present specification, various alternative arrangements may be adopted. For example, the features of the invention may be applied to a so-called (pure) series hybrid vehicle or to a range extender vehicle or the like, in which the rear wheels Wr (or the front wheels Wf) are driven by the first and second electric motors 22A, 22B, together with causing the generator to generate electric power by the internal combustion engine 12 (without driving the front wheels Wf and the rear wheels Wr by the internal combustion engine 12 through the transmission 18), and enabling rear wheel driving (or front wheel driving), or all wheel driving modes.

The invention claimed is:

1. A vehicle in which at least one of a front wheel pair and a rear wheel pair thereof is driven, comprising:
   a left electric motor connected mechanically to a left vehicle wheel;
   a right electric motor connected mechanically to a right vehicle wheel;
   a generator connected mechanically to an internal combustion engine;
   an electrical storage device connected electrically to the left electric motor, the right electric motor, and the generator; and
   a motor controller configured to control motive power generated by the left electric motor and the right electric motor;
   wherein, on a basis of an allowable input/output electric power of the electrical storage device, a generated electric power of the generator, and a left and right total electric power consumed or generated by the left electric motor and the right electric motor together, the motor controller is configured to determine an allowable electric power variation range, which is an allowable variation range for the left and right total electric power, and then based on a value obtained by dividing into equal parts the allowable electric power variation range, the motor controller is configured to separately and independently control the motive power of the left electric motor and the right electric motor.

2. The vehicle according to claim 1, wherein:
   the allowable input/output electric power is an allowable input electric power, and the allowable electric power variation range is an allowable electric power decrease range;
   the vehicle further comprises a charge amount controller configured to control a charge amount of the electrical storage device; and the charge amount controller is configured to lower a target value of the charge amount in response to a decrease in the allowable input electric power.

3. The vehicle according to claim 2, wherein, assuming that the allowable electric power decrease range is represented by TD, the motor controller is configured to determine the allowable electric power decrease range TD by a following inequality:

$$TD \leq -X+Y+Z+L$$

where X represents the generated electric power of the generator, Y represents the left and right total electric power, Z represents the allowable input electric power, and L represents the consumed electric power of an auxiliary electrical device configured to consume electric power of the electrical storage device.

4. The vehicle according to claim 2, wherein at a time that temperature of the electrical storage device decreases, the charge amount controller is configured to lower the target value of the charge amount of the electrical storage device.

5. The vehicle according to claim 2, wherein at a time that temperature of the electrical storage device decreases, the motor controller is configured to lower a limit value of the left and right total electric power.

\* \* \* \* \*